(12) United States Patent
Yoshikuwa

(10) Patent No.: US 7,076,990 B2
(45) Date of Patent: Jul. 18, 2006

(54) LOAD CELL TYPE WEIGHT MEASURING DEVICE

(75) Inventor: Nobuyuki Yoshikuwa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 123 days.

(21) Appl. No.: 10/885,595

(22) Filed: Jul. 8, 2004

(65) Prior Publication Data

US 2005/0023047 A1   Feb. 3, 2005

(30) Foreign Application Priority Data

Jul. 28, 2003   (JP)   ............... 2003-202528

(51) Int. Cl.
*G01G 23/01*   (2006.01)
*G01G 3/13*   (2006.01)

(52) U.S. Cl. ............ 73/1.13; 73/1.15; 73/862.627; 73/862.629; 73/862.632; 73/862.633; 73/862.634; 177/50; 177/229

(58) Field of Classification Search ............ 177/229, 177/50; 73/1.13, 1.15, 862.627, 862.629, 73/862.632, 862.633, 862.634
See application file for complete search history.

(56) References Cited

U.S. PATENT DOCUMENTS

| 3,135,112 | A | * | 6/1964 | Farley ................ 73/862.382 |
| 4,766,965 | A | * | 8/1988 | Luchinger ................ 177/50 |
| 4,890,246 | A | * | 12/1989 | Oldendorf et al. .......... 702/101 |
| 4,938,300 | A | * | 7/1990 | Kunz ..................... 177/164 |
| 4,951,765 | A | * | 8/1990 | Naito et al. ................ 177/211 |
| 4,977,969 | A | * | 12/1990 | Leisinger et al. ............. 177/50 |
| 5,148,881 | A | * | 9/1992 | Leisinger ................. 177/50 |
| 5,254,992 | A | * | 10/1993 | Keen et al. ................ 341/119 |
| 5,550,328 | A | * | 8/1996 | Freeman et al. ............. 177/50 |
| 5,721,398 | A | * | 2/1998 | Balsen et al. ............... 177/184 |
| 6,194,672 | B1 | * | 2/2001 | Burkhard et al. .... 177/210 EM |
| 6,232,567 | B1 | * | 5/2001 | Bonino et al. ....... 177/210 EM |
| 6,326,562 | B1 | * | 12/2001 | Burkhard et al. .... 177/210 EM |
| 6,414,252 | B1 | * | 7/2002 | Emery et al. ............... 177/229 |
| 6,462,288 | B1 | * | 10/2002 | Wong ..................... 177/105 |
| 6,557,391 | B1 | * | 5/2003 | Luchinger .................. 73/1.13 |
| 6,861,593 | B1 | * | 3/2005 | Kuhlmann et al. .. 177/210 EM |

FOREIGN PATENT DOCUMENTS

JP   02-82120 A   *   9/1988   ............. 177/128

* cited by examiner

*Primary Examiner*—Randy W. Gibson
(74) *Attorney, Agent, or Firm*—Manabu Kanesaka

(57) ABSTRACT

A load cell type weight measuring device includes a load cell formed of a strain member provided with a plurality of strain gauges and deforming according to a load applied to a load receptacle. The load cell type weight measuring device converts an output of a Wheatstone bridge circuit formed of the respective strain gauges into a weight value to display. Two weight receptacles are attached to the strain member. It is arranged such that when a load is applied to one of the load receptacles, a strain at a portion of the strain member provided with the strain gauges becomes smaller than that when the load is applied to the other of the load receptacles.

6 Claims, 3 Drawing Sheets

LOAD CELL TYPE WEIGHT MEASURING DEVICE

BACKGROUND OF THE INVENTION AND RELATED ART STATEMENT

The present invention relates to a weight measuring device wherein a load cell is used as a load sensor.

In an electronic scale or an electronic balance using a load cell as a load sensor, as shown in FIG. 5, one end portion of a load cell 51 is fixed to a base 52 and the other end portion thereof is provided with a pan stop 53 as disclosed in, for example, Japanese Patent Publication (Kokai) No. 2000-171289.

The load cell 51 has a strain member 51a having, for example, four strain portions E, and strain gauges S1 to S4 are attached to the strain portions E. As shown in FIG. 6, a Wheatstone bridge is formed of the respective strain gauges S1 to S4. An output value of the Wheatstone bridge is converted into a weight value by using a sensitivity coefficient and is displayed as a calculated value.

The sensitivity coefficient is calibrated and updated by using a weight with a known weight. More specifically, a weight having a known weight is loaded on the pan stop 53 of the load cell 51, and the sensitivity coefficient is updated so that a calculated value corresponds to the known weight. Also, there has been known a weight measuring device equipped with an adding/removing weight mechanism having a built-in weight for calibration, and the built-in weight is placed on a specific position of the load cell 51 as disclosed in, for example, Japanese Patent Publication (Kokai) No. 11-108740.

When the calibration is carried out, normally, a weight with a known weight within a weighing range of the electronic scale or electronic balance is used. Also, the sensitivity calibration is carried out by using a weight below the weighing range. Further, a load cell type weight measuring device has been proposed, wherein a lever mechanism is provided to the load cell 51 so that a weight below the weighing range is loaded, and the sensitivity calibration is carried out in a state that a weight substantially in the vicinity of the weighing range is loaded to the load cell 51 (as disclosed in Japanese Patent Publication (Kokai) No. 11-108740).

In a case that a load cell type weight measuring device has a large weighing range, when a weight in the vicinity of the weighing range is used for the sensitivity calibration, it is necessary to load and unload the weight manually, thereby causing physical burden. Also, when the adding/removing weight mechanism having the built-in weight is used, the weight measuring device tends to be large.

On the other hand, if the sensitivity calibration is carried out by using a weight lighter than a weighing range, it is difficult to calibrate with high accuracy due to a linearity of an output of a load cell (output of a Wheatstone bridge) relative to a load, so that the weight measuring device can not be applied to a load cell with high resolution.

Further, when a weight lighter than a weighing range is loaded to a load cell through a lever mechanism, a structure tends to be complicated and expensive, and it is difficult to carry out the calibration with high precision.

In view of the problems described above, the present invention has been made, and an object of the invention is to provide a load cell type weight measuring device with a simple structure, wherein a sensitivity calibration can be carried out with high precision even when a weight lighter than a weighing range is used.

Another object of the invention is to provide a dual range load cell type weight measuring device with a simple structure.

Further objects and advantages of the invention will be apparent from the following description of the invention.

SUMMARY OF THE INVENTION

According to a first aspect of the invention, a load cell type weight measuring device includes a load cell formed of a strain member provided with a plurality of strain gauges and deforming according to a load applied to a load receptacle. The load cell type weight measuring device converts an output of a Wheatstone bridge circuit formed of the respective strain gauges into a weight value to display. Two weight receptacles are attached to the strain member. It is arranged such that when a load is applied to one of the load receptacles, a strain at a portion of the strain member provided with the strain gauges becomes smaller than that when the load is applied to the other of the load receptacles.

According to a second aspect of the invention, a free end of the strain member other than a portion thereof fixed to the device is divided into two areas, i.e. one area including a portion provided with the strain gauges and the other area, with a cut portion extending along a direction that the load is applied. The other of the load receptacles is attached to only the area including the portion provided with the strain gauge. The one of the load receptacles is attached to the strain member such that the whole strain member deforms.

According to a third aspect of the invention, in the weight measuring device according to one of the first and second aspects, it is arranged such that an output of the Wheatstone bridge same as that when a load in the vicinity of the weighing range is placed on the one of the load receptacles can be obtained when a weight lighter than a weighing range of the weight measuring device is placed on the other of the load receptacles to thereby carry out a sensitivity calibration of the weight measuring device.

According to a fourth aspect of the invention, the weight measuring device according to one of the first to third aspects further includes a memory device for storing a sensitivity coefficient corresponding to each of the two load receptacles and a selecting device for selecting one of the load receptacles for placing a load to be measured. An output of the Wheatstone bridge is converted to a weight value by using the sensitivity coefficient corresponding to the selected load receptacle.

In the present invention, the two load receptacles are attached to the load cell. It is arranged such that when the loads are placed to the respective load receptacles, the strain portions have different strains. More specifically, when a predetermined load is placed on one of the two load receptacles attached to the load cell, a strain of the strain portion same as that when a load lighter than the predetermined load is placed on the other load receptacle can be obtained. Accordingly, when a weight lighter than the weighing range of the weight measuring device is placed on the other load receptacle, the output of the Wheatstone bridge same as that when a weight within the weighing range is placed on the one the load receptacles can be obtained.

Therefore, when the weight lighter than the weighing range is placed on the other load receptacle to carry out the sensitivity calibration, it is possible to carry out the calibration same as a case that the sensitivity calibration is carried out by placing the weight in the vicinity of the weighing range on the one load receptacle. Thus, it is possible to carry out the sensitivity calibration with high precision by using a lighter weight.

In the second aspect of the invention, the cut portion is formed in a direction that the load is applied on the strain member for dividing the strain member into the areas, i.e. the area provided with the strain gauges and the other area. The other load receptacle is attached to only the area provided with the strain gauges, and the one load receptacle deforms the entire strain member. Accordingly, it is possible to obtain the same strain at the strain portions when different weights are placed on the two load receptacles as described above, thereby obtaining the effects described above with a simple structure.

With the load cell described in the fourth aspect of the invention, one of the two load receptacles is selected when an unknown weight is measured. A sensitivity coefficient corresponding to the selected load receptacle is used to convert an output of the Wheatstone bridge into a weight value, thereby providing the weight measuring device with a dual range capability.

DETAILED DESCRIPTION OF PREFERRED EMBODIMENT

Figure 1:
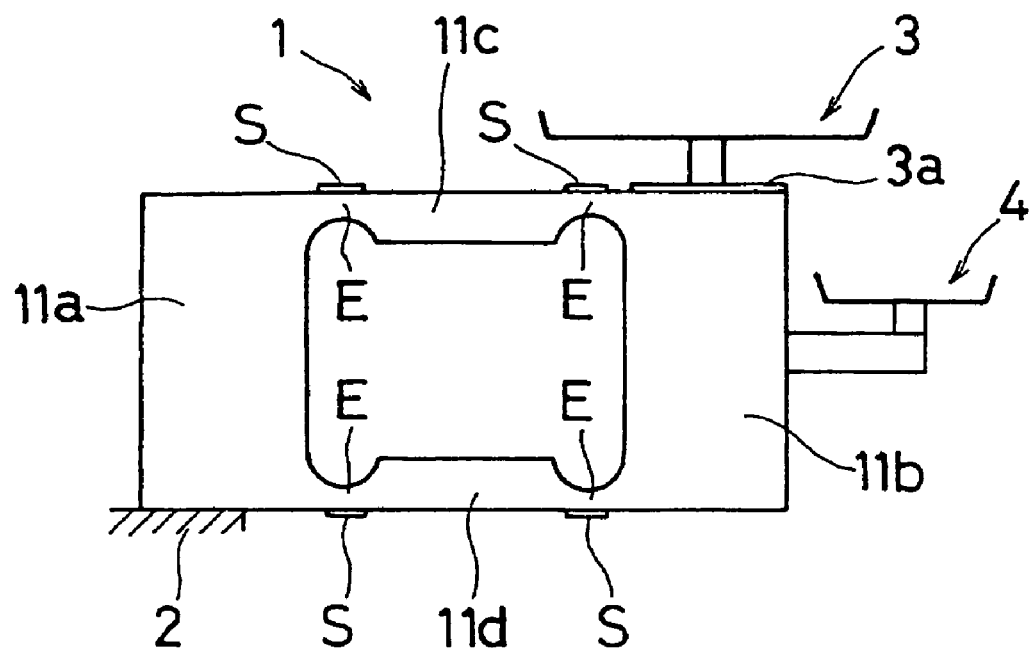
FIG. 1 is a schematic front view showing a mechanical structure of an essential part of a weight measuring device according to an embodiment of the invention.
Figure 2:
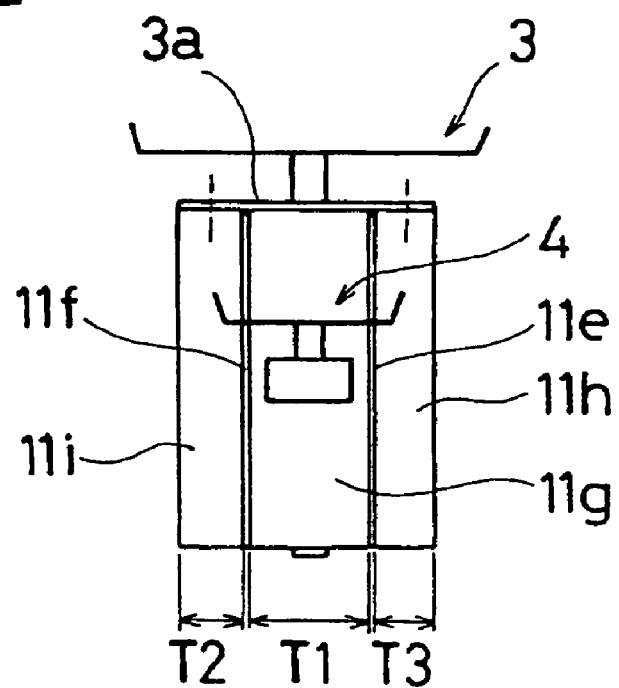
FIG. 2 is a right side view of the weight measuring device shown in FIG. 1.
Figure 3:
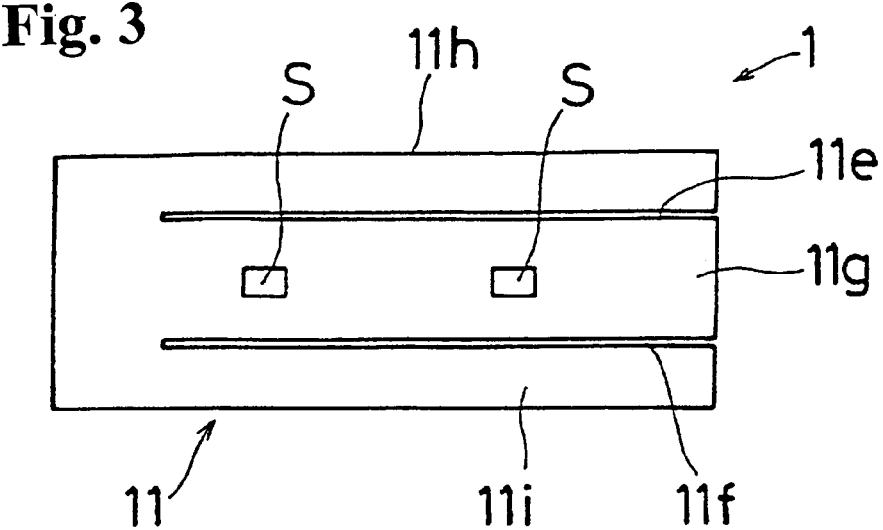
FIG. 3 is a plan view of a load cell 1 of the weight measuring device according to the embodiment of the invention.

Hereunder, embodiments of the invention will be explained with reference to the accompanying drawings. FIG. 1 is a schematic front view showing a mechanical structure of an essential part of a weight measuring device according to an embodiment of the invention. FIG. 2 is a right side view of the weight measuring device shown in FIG. 1. FIG. 3 is a plan view of a load cell 1 of the weight measuring device according to the embodiment of the invention.

Basically, the load cell 1 has a structure wherein four strain gauges S are bonded on a strain member 11 similar to a conventional structure. The strain member 11 is obtained by machining a single block and has two parallel beam portions 11c and 11d connecting top portions of two columns 11a and 11b. Straining portions E are formed on both ends of the respective beam portions 11c and 11d. The respective strain gauges S are bonded to the strain member 1 on a center line thereof in the widthwise direction (direction perpendicular to an extending direction of the beams 11c and 11d on a horizontal plane), and the four strain gauges S are mutually connected to form a Wheatstone bridge similar to a conventional one. Also, a lower surface of the column 11a of the load cell 1 is fixed to a base 2 of the device.

The strain member 11 includes two incisions 11e and 11f extending from an upper surface to a lower surface of the strain member 11 along a vertical direction to sandwich the respective strain gauges S, and reaching a leading end of a free end except the portion fixed to the device base 2. Accordingly, the strain member 11 is divided into a central portion 11g including the respective gauges S and both side portions 11h and 11i on both sides thereof with the respective incisions 11e and 11f.

A first load receptacle 3 having a leg portion 3a extending over the central portion 11g and the both side portions 11h and 11i of the strain member 11 is attached to an upper surface of the leading end of the free end of the load cell 1. The first load receptacle 3 is fixed to the both side portions 11h and 11i of the strain member 11 at the leg portion 3a thereof, and is not fixed to the central portion 11g. However, a load applied to the first load receptacle 3 is transmitted to the central portion 11g as well as the both side portions 11h and 11i.

A second load receptacle 4 is fixed at the leading end of the free end of the central portion 11g of the strain member 11 in the road cell 1. The second load receptacle 4 does not contact the both side portions 11h and 11i of the strain member 11. Accordingly, the load applied to the second load receptacle 4 is transmitted to only the central portion 11g of the strain member 11.

When a width of the central portion 11g of the strain member 11 is T1 and widths of the both the side portions 11h and 11i are T2 and T3, the following relationship is established.

$$T1=(T1+T2+T3)/2$$

Accordingly, when a load W1 is placed on the first load receptacle 3 to deform the whole strain member 11, a strain of each strain portion E becomes half of that of each strain portion E when the load W1 is placed on the second load receptacle 4. In other words, in order to obtain an output of the Wheatstone bridge same as that when the load W1 is placed on the first load receptacle 3, a load W2 to be placed on the second load receptacle 4 is the half of W1.

Figure 4:
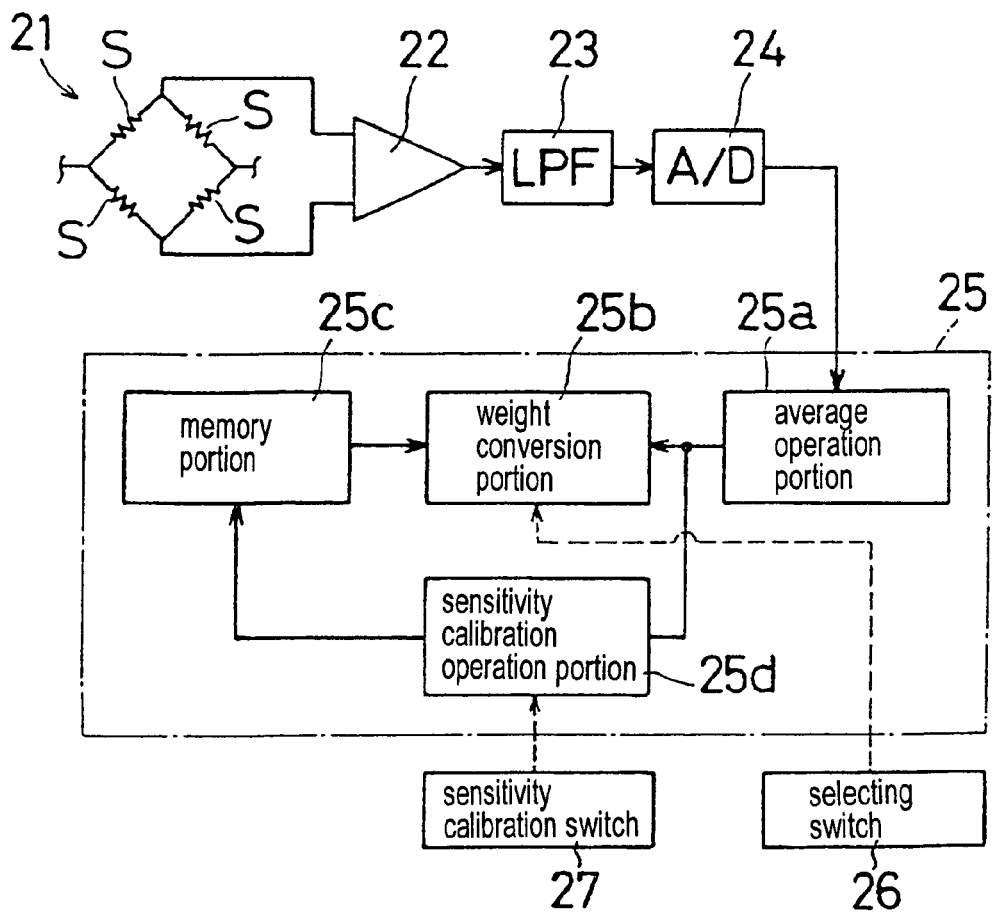
FIG. 4 is a block diagram of the weight measuring device according to the embodiment of the invention.
Figure 5:
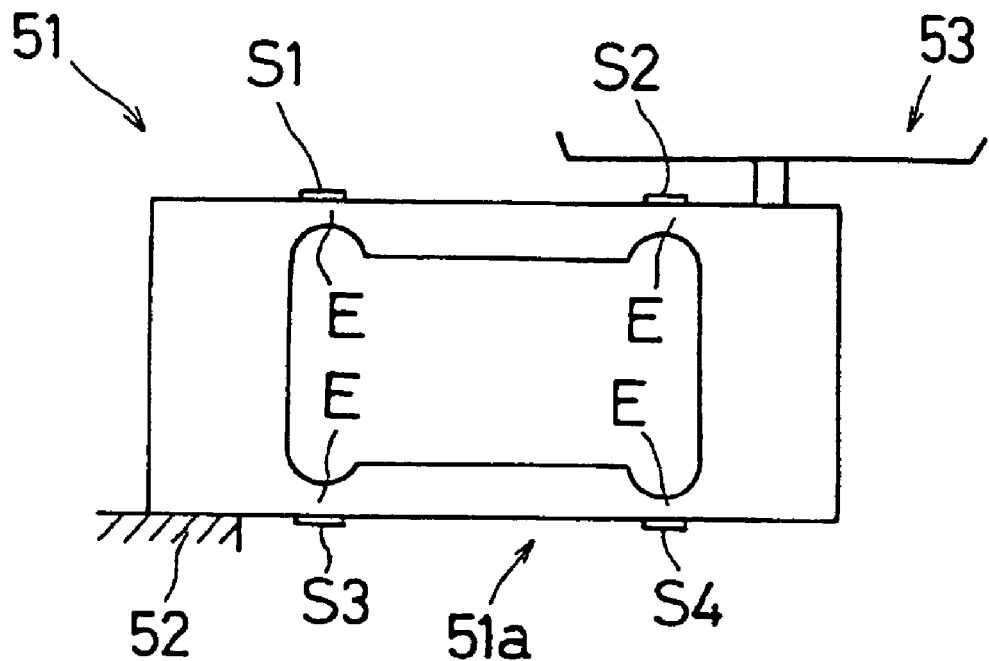
FIG. 5 is an explanatory view of an essential part of a conventional electronic scale or electronic balance.
Figure 6:
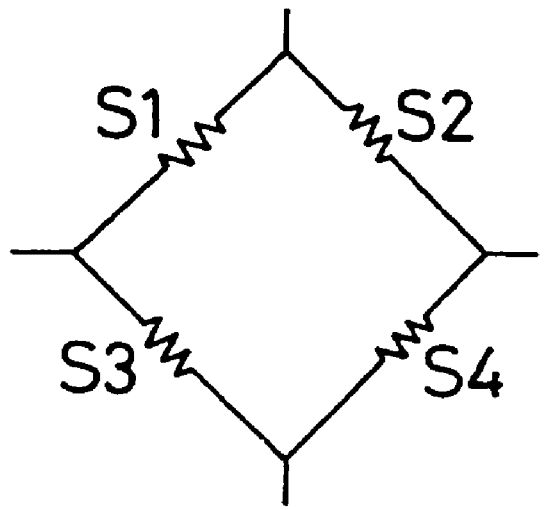
FIG. 6 is an explanatory view of a Wheatstone bridge formed of strain gauges shown in FIG. 5.

The output of the Wheatstone bridge formed of the respective strain gauges S is calculated as follows and displayed as a measured value. FIG. 4 is a block diagram showing an electrical structure of the weigh device according to the embodiment of the invention. An output of a Wheatstone bridge 21 formed of the respective strain gauges S is digitized at a real time with an A–D converter 24 through an amplifier 22 and a low-pass filter 23, and introduced into an arithmetic device 25.

An operation apparatus 25 is mainly formed of CPU, ROM and RAM, and is operated according to a program stored in ROM. In the specification, in order to simplify the explanation, the respective functions of the program are shown by a block diagram. The operation apparatus 25 mainly includes an average operation portion 25a for averaging a digital conversion data from the Wheatstone bridge 21; a weight conversion portion 25b for converting the averaged data to a weight value by using a sensitivity coefficient; a memory portion 25c for storing the sensitivity coefficient; and a sensitivity calibration operation portion 25d. The operation apparatus 25 also includes a selecting switch 26 for selecting the first load receptacle 3 and the second load receptacle 4 when the ordinary measurement is carried out; and a sensitivity calibration switch 27 for allowing the sensitivity calibration operation portion 25d to function.

The memory portion 25c stores sensitivity coefficients K1 and K2 corresponding to the first load receptacle 3 and the second load receptacle 4, respectively. The weight conversion portion 25b converts the data from the Wheatstone bridge 21 to a weight value by using the sensitivity coefficient corresponding to the load receptacle selected by the selecting switch 26. As described above, a ratio of the sensitivities of the first load receptacle 3 and the second load receptacle 4 is 1:2, i.e. K1 =K2/2, so that a dual range can be achieved by selecting the first load receptacle 3 or the second load receptacle 4.

When the sensitivity calibration is carried out, the sensitivity calibrating switch 27 is operated, and a specific weight having a known weight Wk in the vicinity of one half of a weighing range is placed on the second load receptacle 4. As a result, the output of the Wheatstone bridge 21 becomes equal to a value when a load in the vicinity of the weighing range is placed on the first load receptacle 3. In the sensitivity calibration operation portion 25d, when the output of the Wheatstone bridge 21 is converted by using the digital conversion data and the sensitivity coefficients K1 and K2 thereof, the sensitivity coefficients K1 and K2 are updated to be 2Wk and Wk, respectively. Therefore, by using a weight of substantially one half of the weighing range, it is possible to perform the sensitivity calibration with the same accuracy as that when the calibration is performed by using a weight substantially equal to the weighing range.

In the embodiment described above, the widths T1, T2 and T3 of the central portion 11g and both side portions 11h, 11i of the strain member 11 are set so that the ratio of the sensitivities of the first load receptacle 3 and the second load receptacle 4 becomes 1:2. However, the present invention is not limited thereto. The widths may be set so that any ratio can be obtained.

In the embodiment described above, an adding/removing weight mechanism may be provided to the second load receptacle 4 so that a calibration weight is added or removed. In this case, it is desirable that the second load receptacle portion 4 is used as a load receptacle portion exclusive for calibration and a weight measuring device has a single range.

As described above, in the load cell type weight measuring device according to the present invention, with a simple structure, the sensitivity calibration can be carried out with accuracy equal to that when the sensitivity calibration is carried out by using a weight lighter than the weighing range, i.e. a weight same as the weighing range. Also, a dual range weight measuring device can be easily attained.

The disclosure as disclosed in Japanese Patent Application No. 2003-202528 filed on Jul. 28, 2003 is incorporated herein.

While the invention has been explained with reference to the specific embodiments of the invention, the explanation is illustrative and the invention is limited only by the appended claims.

What is claimed is:

1. A weight measuring device comprising:
   a load cell formed of a strain member deforming according to a weight applied thereto,
   a plurality of strain gauges bonded to the load cell and connected to form a Wheatstone bridge so that an output of the Wheatstone bridge is converted into a value of the weight, and
   two weight receptacles attached to the strain member so that when a load is applied to one of the weight receptacles, a strain of the strain member becomes smaller than that when the load is applied to the other of the weight receptacles,
   said strain member including a fixed portion, and a free end portion divided into a first portion with the strain gauges and a second portion without the strain gauges along a direction that the load is applied, the one of said weight receptacles being attached to the first portion and the other of said weight receptacles being attached to deform the first and second portions.

2. A weight measuring device according to claim 1, wherein said strain member includes at least one cutting portion to form the first portion and the second portion.

3. A weight measuring device according to claim 2, wherein said strain member is divided into three sections extending along the direction that the load is applied and separated by cutting portions at the free end portion, a central portion forming the first portion and two side portions forming the second portion.

4. A weight measuring device according to claim 3, wherein said one of the weight receptacles is attached to the center portion, and said other of the weight receptacles is attached to the two side portions crossing the center portion above the center portion.

5. A weight measuring device according to claim 1, wherein said load cell is arranged such that when a weight lighter than a weighing range is placed on the other of the weight receptacles to perform a sensitivity calibration, an output of the Wheatstone bridge becomes substantially same as that when a weight within the weighing range is placed on the one of the weight receptacles.

6. A weight measuring device according to claim 1, further comprising a memory device for storing a sensitivity coefficient corresponding to each of the weight receptacles, and a selecting device for selecting one of the weight receptacles for placing the weight so that the output of the Wheatstone bridge is converted to the value of the weight by using the sensitivity coefficient corresponding to the one of the weight receptacles.

* * * * *